US012703382B2

(12) United States Patent
Zhang et al.

(10) Patent No.: US 12,703,382 B2
(45) Date of Patent: Aug. 11, 2026

(54) MOTION PLANNING USING SPATIO-TEMPORAL CONVEX CORRIDORS

(71) Applicant: Huawei Technologies Co., Ltd., Shenzhen (CN)

(72) Inventors: Weize Zhang, Markham (CA); Peyman Yadmellat, North York (CA); Zhiwei Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 645 days.

(21) Appl. No.: 18/119,771

(22) Filed: Mar. 9, 2023

(65) Prior Publication Data

US 2023/0211802 A1 Jul. 6, 2023

Related U.S. Application Data

(63) Continuation of application No. PCT/CN2021/118153, filed on Sep. 14, 2021.

(51) Int. Cl.
*B60W 60/00* (2020.01)

(52) U.S. Cl.
CPC ................................ *B60W 60/001* (2020.02)

(58) Field of Classification Search
None
See application file for complete search history.

(56) References Cited

U.S. PATENT DOCUMENTS

| | | | | |
|---|---|---|---|---|
| 9,895,803 B1 | | 2/2018 | Oslund | |
| 2007/0179685 A1 | | 8/2007 | Mark et al. | |
| 2018/0164827 A1* | | 6/2018 | Chu | B60W 60/0016 |
| 2020/0341476 A1* | | 10/2020 | Wuthishuwong | G08G 1/167 |
| 2021/0088345 A1* | | 3/2021 | Paden | B60W 50/06 |
| 2021/0262819 A1* | | 8/2021 | Yu | G01C 21/3602 |
| 2022/0017112 A1* | | 1/2022 | Liu | B60W 60/0011 |
| 2024/0300541 A1* | | 9/2024 | Dangel | B60W 60/0027 |

FOREIGN PATENT DOCUMENTS

| | | |
|---|---|---|
| CN | 111923905 A | 11/2020 |
| CN | 112068588 A | 12/2020 |

OTHER PUBLICATIONS

T. Zhang, M. Fu, W. Song, Y. Yang and M. Wang, "Trajectory Planning Based on Spatio-Temporal Map With Collision Avoidance Guaranteed by Safety Strip," in IEEE Transactions on Intelligent Transportation Systems, vol. 23, No. 2, pp. 1030-1043, Feb. 2022, doi: 10.1109/TITS.2020.3019514 (Year: 2020).*

(Continued)

*Primary Examiner* — Khoi H Tran
*Assistant Examiner* — Trang Dang

(57) ABSTRACT

Systems, methods and computer-readable media for path planning for an autonomous vehicle, including receiving data defining upper and lower bounds of a spatio-temporal convex corridor, and computing a plurality of control point times within a corridor start time and a corridor end time. For each of the control point times, respective control point maximum values and control point minimum values are determined. Respective control point values are computed for each of the control point times, the control point values defining a curve segment that is within the upper and lower bounds of the spatio-temporal convex corridor.

20 Claims, 14 Drawing Sheets

(56) References Cited

OTHER PUBLICATIONS

Ding, Wenchao & Zhang, Lu & Chen, Jing & Shen, Shaojie. (2019). Safe Trajectory Generation For Complex Urban Environments Using Spatio-temporal Semantic Corridor. IEEE Robotics and Automation Letters. pp. 1-1. 10.1109/LRA.2019.2923954. (Year: 2019).*

Ding, W., Zhang, L., Chen, J., & Shen, S. (2019). Safe Trajectory Generation for Complex Urban Environments Using Spatio-Temporal Semantic Corridor. IEEE Robotics and Automation Letters, 4, 2997-3004. (Year: 2019).*

Li, J., Xie, X., Ma, H., Liu, X., & He, J. (2021). Speed Planning Using Bezier Polynomials with Trapezoidal Corridors. ArXiv, abs/2104.11655. (Year: 2021).*

Morsali, Mahdi, Erik Frisk, and Jan Aslund. “Spatio-Temporal Planning in Multi-Vehicle Scenarios for Autonomous Vehicle Using Support Vector Machines.” IEEE Transactions on Intelligent Vehicles (2020).

Moghadam, Majid, and Gabriel Hugh Elkaim. “An Autonomous Driving Framework for Long-term Decision-making and Short-term Trajectory Planning on Frenet Space.” arXiv preprint arXiv:2011.13099 (2020).

Ding, Wenchao, et al. “Safe trajectory generation for complex urban environments using spatio-temporal semantic corridor.” IEEE Robotics and Automation Letters 4.3 (2019): 2997-3004.

Li, Jialun, et al. “Speed Planning Using Bezier Polynomials with Trapezoidal Corridors.” arXiv preprint arXiv:2104.11655 (2021).

Zhang, Ting, et al. “Trajectory Planning Based on Spatio-Temporal Map With Collision Avoidance Guaranteed by Safety Strip.” IEEE Transactions on Intelligent Transportation Systems (2020).

* cited by examiner

Rectangular corridors

Trapezoidal corridors

General convex corridors
Safe Space 42
Safe Space 42
S
T
L
44
52
58
54
56

44
60
S
T 44
60
S
T 44
60
S
T

S
T
402(2)
502(2)
402(1)
502(1)

504(5)
504(4)
504(3)
402
502
Bezier curve
504(2)
504(1)
504(0)
$t_1$
$t_2$

MOTION PLANNING USING SPATIO-TEMPORAL CONVEX CORRIDORS

RELATED APPLICATION DATA

The present application is a continuation of International Patent Application No. PCT/CN2021/118153, filed Sep. 14, 2021, the contents of which are incorporated herein by reference.

FIELD

The present disclosure is related to systems, methods, and computer-readable media for motion planning using spatio-temporal convex corridors.

BACKGROUND

An autonomous vehicle (e.g. a self-driving car) is a vehicle that includes different types of sensors to sense an environment surrounding the vehicle (e.g., the presence and state of stationary and dynamic objects that are in the vicinity of the vehicle) and operating parameters of the vehicle (e.g. vehicle speed, acceleration, pose, etc.) and is capable of operating itself safely without any human intervention.

An autonomous vehicle typically includes various software systems for perception and prediction, localization and mapping, as well as for planning and control. The software system for planning (generally referred to as a planning system) plans a trajectory for the vehicle to follow based on target objectives, the vehicle's surrounding environment, and physical parameters of the vehicle (e.g. wheelbase, vehicle width, vehicle length, etc.). A software system for control of the vehicle (e.g. a vehicle control system) receives the trajectory from the planning system and generates control commands to control operation of the vehicle to follow the trajectory.

The planning system may include multiple planners (which may also be referred to as planning units, planning sub-systems, planning modules, etc.) arranged in a hierarchy. The planning system generally includes: a mission planner, a behavior planner, and a motion planner. The motion planner receives as input a behavior decision for the autonomous vehicle generated by the behavior planner as well as information about the vehicle state (including a sensed environmental data and vehicle operating data), and the road network the vehicle is travelling on and performs motion planning to generate a trajectory for the autonomous vehicle. In the present disclosure, a trajectory includes a sequence, over multiple time steps, of a position for the autonomous vehicle in a spatio-temporal coordinate system. Other parameters can be associated with the trajectory including vehicle orientation, vehicle velocity, vehicle acceleration, vehicle jerk or any combination thereof.

The motion planning system is configured to generate a trajectory that meets criteria such as safety, comfort and mobility within a spatio-temporal search space that corresponds to the vehicle state, the behavior decision, and the road network the vehicle is travelling on. Motion planning systems can face challenges in realizing safe local motion planning for self-driving vehicles when there are time-dependent constraints. A time-dependent constraint typically arises due to dynamic objects such as other vehicles, pedestrians, and cyclists, which may change the available spatio-temporal search space over time. In a more general sense, any changes in the surrounding environments (due to moving objects, traffic light status change, etc.) and/or changes in behaviour decisions may result in time-dependent constraints. To formulate this problem as an optimization problem, a common approach is to decompose the available search space into multiple corridors spanned over time. Each corridor defines an available range in the spatio-temporal search space. Consecutive corridors overlap at a point in time to guarantee the existence of a solution. Given these corridors, the motion planning problem reduces to finding a trajectory segment for each corridor and connect the trajectory segments at each overlapping point to generate a continuous trajectory within the available search space from an initial position of the vehicle to a target position. The initial position of the vehicle may be a current position of the vehicle, a point on a previous time trajectory or a point distant to a current position.

As an example, FIG. 1 shows a sample driving scenario on a road. The dotted area shows the occupied or non-drivable area 11 (for example out of road boundary area), the drivable area is marked by outlined diamond pattern 13, and corridors are displayed by white rectangles 12. For the sake of simplicity, it is assumed that the scenario is a static scenario (all objects are stationary). As such, there is no need to consider the time-axis in this specific scenario, and the search space is projected on an SL plane, where S and L refer to spatial coordinates in the Frenet frame. The S coordinate is the longitudinal distance along the tangent vector of the road. The L coordinate is the lateral distance to the road along the normal vector of the road. The origin of the Frenet frame is a moving reference, typically placed at the closest point to the vehicle on the center line of a driving zone (e.g., a road or a lane of a road). The position of the origin 15 changes based on the position of the vehicle at each planning cycle. In the scenario of FIG. 1, a trajectory segment 16 is generated within each corridor rectangle 12. The first trajectory segment 16 starts from the current position 15 of the vehicle to a point on the overlapping edge between the 1st (current) corridor and the 2nd (next) corridor. The process is repeated for each corridor to get a trajectory from the start position 14 to a target position 17. The process is similar in dynamic environments with the difference that the search space is a 3D SLT space (where T refers to the time coordinate) in contrast to a 2D SL space in the static environment illustrated in FIG. 1. To deal with planning in dynamic environments, existing methods project the SLT search space into ST and LT planes. This is typically done by decomposing the drivable area/free space (hereafter referred to as the available area) into rectangular ST and/or LT corridors (cubical corridors in SLT space). Since the rectangular corridors only covers a portion of the available area, the resulting trajectory is always a suboptimal solution. That is, a more optimized trajectory might be found if each corridors covered a greater portion of the available area. To this end, a recent approach described in Li, Jialun, et al. "Speed Planning Using Bezier Polynomials with Trapezoidal Corridors." arXiv preprint arXiv:2104.11655 (2021), uses trapezoidal corridors, a static example of which is illustrated in FIG. 2A projected on the SL plane. While still limited, trapezoidal corridors can potentially cover a larger area in some driving scenarios compared to rectangular corridors. Another approach is to maximize the coverage by considering smaller corridors and increasing the number of corridors, an example of which is illustrated in FIG. 2B. However, increasing the number of corridors can negatively impact the optimization execution time as it increases the number of trajectory segments, and may result in non-real time solution. Moreover, there is no guarantee that increasing the number of rectangular or trapezoidal corridors will improve search space coverage given the simple shape (geometry) of the corridors.

The trapezoidal corridor of FIG. 2A illustrates an example of Bezier curve trajectory generation. In the example of FIG. 2A, multiple control points 20 are plotted inside a safety passage (corridor 21), and a Bezier curve 22 is generated from these points 20. The curve 22 won't go beyond the outer boundary of corridor 21 due to the "convex hull property" of a Bezier curve. Note that both axis (SL) are spatial dimensions. However, calculation of the Bezier curve within a safe corridor in a scenario where there is a time-dependency, i.e., planning in a spatio-temporal space (e.g., ST and LT spatio-temporal planes) can be problematic.

Accordingly, there is a need for systems and methods that can enable a curve trajectory to be generated within a safe corridor that optimizes the available search space for the trajectory.

SUMMARY

According to a first example aspect of the present disclosure is a computer implemented method for motion planning for an autonomous vehicle. The method includes: receiving data defining: (i) a first dimension upper bound of a spatio-temporal convex corridor in a first spatial dimension as a concave function of time between a corridor start time and a corridor end time, and (ii) a first dimension lower bound of the spatio-temporal convex corridor in the first spatial dimension as a convex function of time between the corridor start time and the corridor end time, the first spatial dimension corresponding to a first spatio-temporal plane; computing a plurality of control point times within the corridor start time and the corridor end time, the control point times including at least a start control point time, an end control point time and an intermediate control point time between the start control point time and the end control point time; determining, for each of the control point times, a respective first control point maximum value that corresponds to a value of the first dimension upper bound at the control point time; determining, for each of the control point times, a respective first control point minimum value that corresponds to a value of the first dimension lower bound at the control point time; computing, based on the respective first control point maximum values and the respective first control point minimum values, respective first dimension control point values for each of the control point times, the first dimension control point values defining a first curve segment that is within the first dimension upper bound and the first dimension lower bound of the spatio-temporal convex corridor; and outputting a planned trajectory for controlling an operation of the autonomous vehicle based on the first curve segment.

In at least some planning applications, the use of more complex spatio-temporal corridor shapes may allow for an increase in the search space coverage provided by a corridor. This can minimize the computation cost (e.g., optimize CPU usage, execution time, and power consumption) required to find a trajectory solution, and can also enable solutions that may be more efficient and comfortable from the standpoint of operation a vehicle by permitting trajectories that require lower acceleration and/or jerk.

In some example aspects, computing the first dimension control point values is performed to collectively optimize a first defined cost function for the first curve segment through the spatio-temporal convex corridor in the first spatio-temporal plane.

In one or more of the preceding aspects, the first spatial dimension corresponds to one of: (i) a longitudinal distance along a tangent vector of a road and (ii) a lateral distance to the roadway along a normal vector of the road.

In one or more of the preceding aspects, the first spatial dimension corresponds to a distance axis in a three dimensional Cartesian coordinate system having time as another axis.

In one or more of the preceding aspects, the received data also defines: (iii) a second dimension upper bound of the spatio-temporal convex corridor in a second spatial dimension as a concave function of time between the corridor start time and corridor end time, and (iv) a second dimension lower bound of the spatio-temporal convex corridor in the second spatial dimension as a convex function of time between the corridor start time and the corridor end time, the second spatial dimension corresponding to a second spatio-temporal plane that coincides in time with the first spatio-temporal plane. The method further includes determining, for each of the control point times, a respective second control point maximum value that corresponds to a value of the second dimension upper bound at the respective control point time; determining, for each of the control point times, a respective second control point minimum that corresponds to a value of the second dimension lower bound at the respective control point time; computing, based on the respective second control point maximum values and the respective second control point minimum values, respective second dimension control point values for each of the control point times, the second dimension control point values defining a second curve segment that falls within the second dimension upper bound of the spatio-temporal convex corridor and the second dimension upper bound of the spatio-temporal convex corridor; wherein the planned trajectory is outputted based on both the first curve segment and the second curve segment.

In one or more of the preceding aspects, computing the second dimension control point values is performed to collectively optimize a second defined cost function for the second curve segment through the spatio-temporal convex corridor in the second spatio-temporal plane.

In one or more of the preceding aspects, the first spatial dimension corresponds to a longitudinal distance along a tangent vector of a roadway and the second spatial dimension corresponds to a lateral distance to the roadway along a normal vector of the road.

In one or more of the preceding aspects, the first spatial dimension and second spatial dimension correspond respectively to a first distance axis and a second distance axis in a three dimensional Cartesian coordinate system having time as a third axis.

In one or more of the preceding aspects, each first curve segment is an n-order parametric curve and the plurality of plurality of control point times includes n+1 plurality of control point times that are uniformly spaced in time.

In one or more of the preceding aspects, each first curve segment is an n-order Bezier curve.

In one or more of the preceding aspects, each first curve segment is an n-order B-spline curve.

In one or more of the preceding aspects, the received data defines respective first dimension upper bounds and first dimension lower bounds for a plurality of successive spatio-temporal convex corridors; respective first curve segments are generated for each of the successive spatio-temporal convex corridors; and the planned trajectory for the autonomous vehicle extends through the plurality of successive spatio-temporal convex corridors and is computed based on the respective first curve segments.

In one or more of the preceding aspects, the method includes computing constraints on the first spatial dimension control point values for each of the successive spatio-temporal convex corridors to provide continuity for a trajectory path that extends through the successive spatio-temporal convex corridors, wherein the plurality of first spatial dimension control point values for each of the successive spatio-temporal convex corridors are computed also based on the constraints.

In some aspects, the present disclosure provides a system for trajectory planning for an autonomous vehicle, the system comprising a processing system configured by instructions to cause the system to perform any of the aspects of the method described above.

In some aspects, the present disclosure provides a computer-readable medium storing instructions for execution by a processing system for trajectory planning for an autonomous vehicle. The instructions when executed cause the system to perform any of the aspects of the method described above.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

As used herein, the term "within" when used in the context of a range or boundary is inclusive of the values that define the outer range or boundary and all intermediate values between such values. For example, "within 1 to 10" includes the values 1 and 10 and all values there between.

According to example aspects, motion planning is performed using spatio-temporal convex corridors to define the search space for generating a trajectory for an autonomous vehicle. A convex corridor is a geometric shape in which any straight line segments connecting two points on the boundary of the shape lies within the shape, i.e., for any two points within the shape, the line segment between the points never goes outside of the shape. In at least some planning applications, the use of spatio-temporal corridor shapes that are more complex than the previously used rectangular or trapezoidal shapes allows for more search space coverage with less number of corridors. This can minimize the computation cost (e.g., optimize CPU usage, execution time, and power consumption) required to find a trajectory solution, and can also enable solutions that may be more efficient and comfortable from the standpoint of operation a vehicle by permitting trajectories that require lower acceleration.

Figures 3, 4:
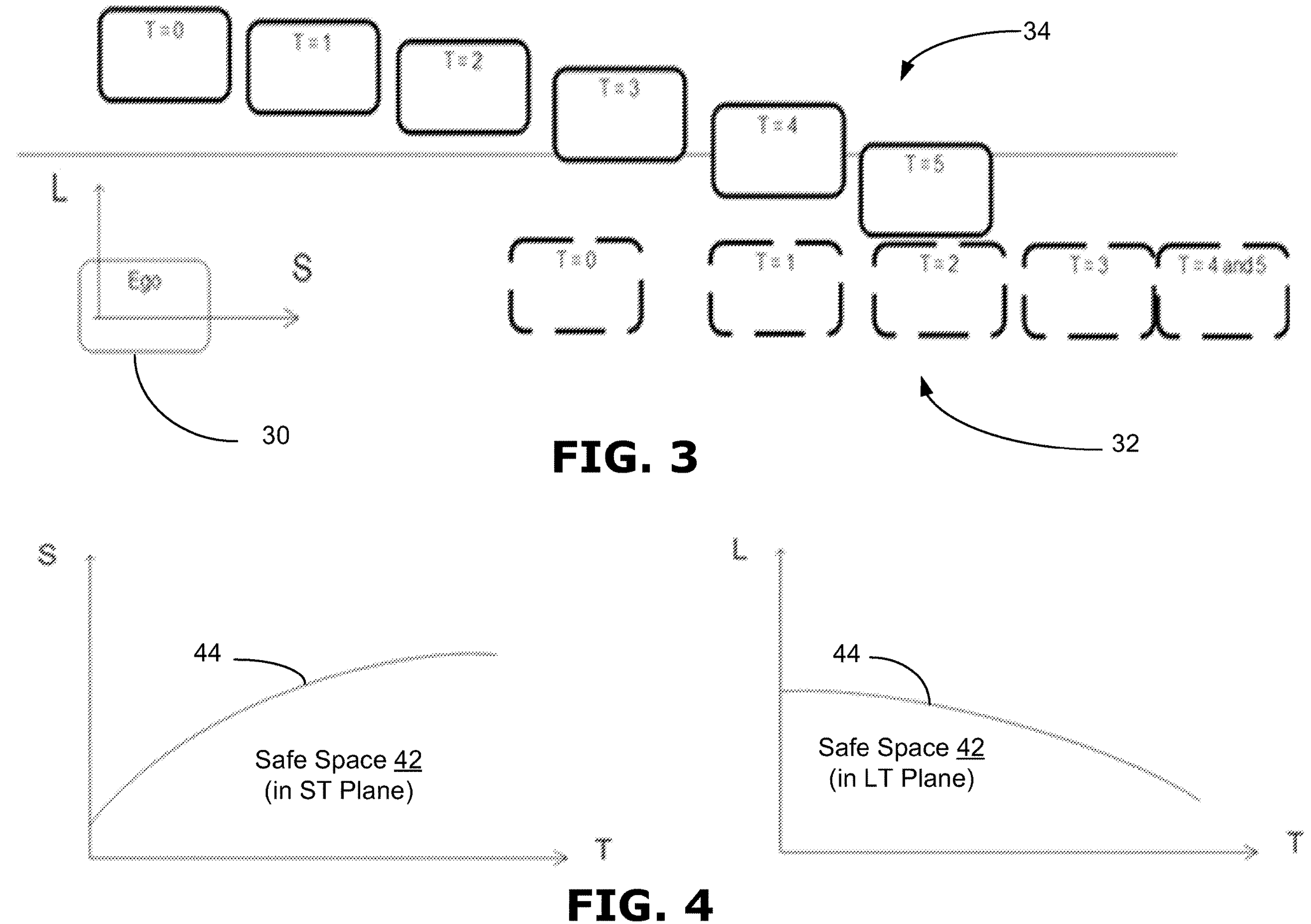
FIG. 3 shows a sample dynamic driving scenario.
FIG. 4 shows examples of safe regions for an ego vehicle in ST and LT spatio-temporal planes that corresponds to the scenario of FIG. 3.

To provide context for the following description, and example of a driving scenario with corresponding ST/LT graphs of different corridor shapes will be described with reference to FIGS. 3, 4, 5A, 5B, 5C, 6A, 6B and 6C. FIG. 3 illustrates a scenario showing a predicted trajectory along a roadway of an ego vehicle 30 and first and second other vehicles 32, 34 over a duration of 5 seconds. At a starting time, the first vehicle 32 (in dash line) stays in front of the ego vehicle 30, and the second vehicle 34 (in solid line) stays at the left side of ego vehicle. Over the next 5 seconds, the first vehicle 32 is decelerating, and the second vehicle 34 cuts into the lane of the ego vehicle 30 and pushes the ego vehicle 30 to the right. After projecting all traffic vehicles onto the ST and LT planes, the corresponding ST and LT graphs of a collision free, safe space 42 (e.g., the region under the plotted spatio-temporal safe space boundary curves 44, which corresponds to the search space for a safe trajectory curve) for the ego vehicle are shown in FIG. 4.

Figures 5A, 5B, 5C:
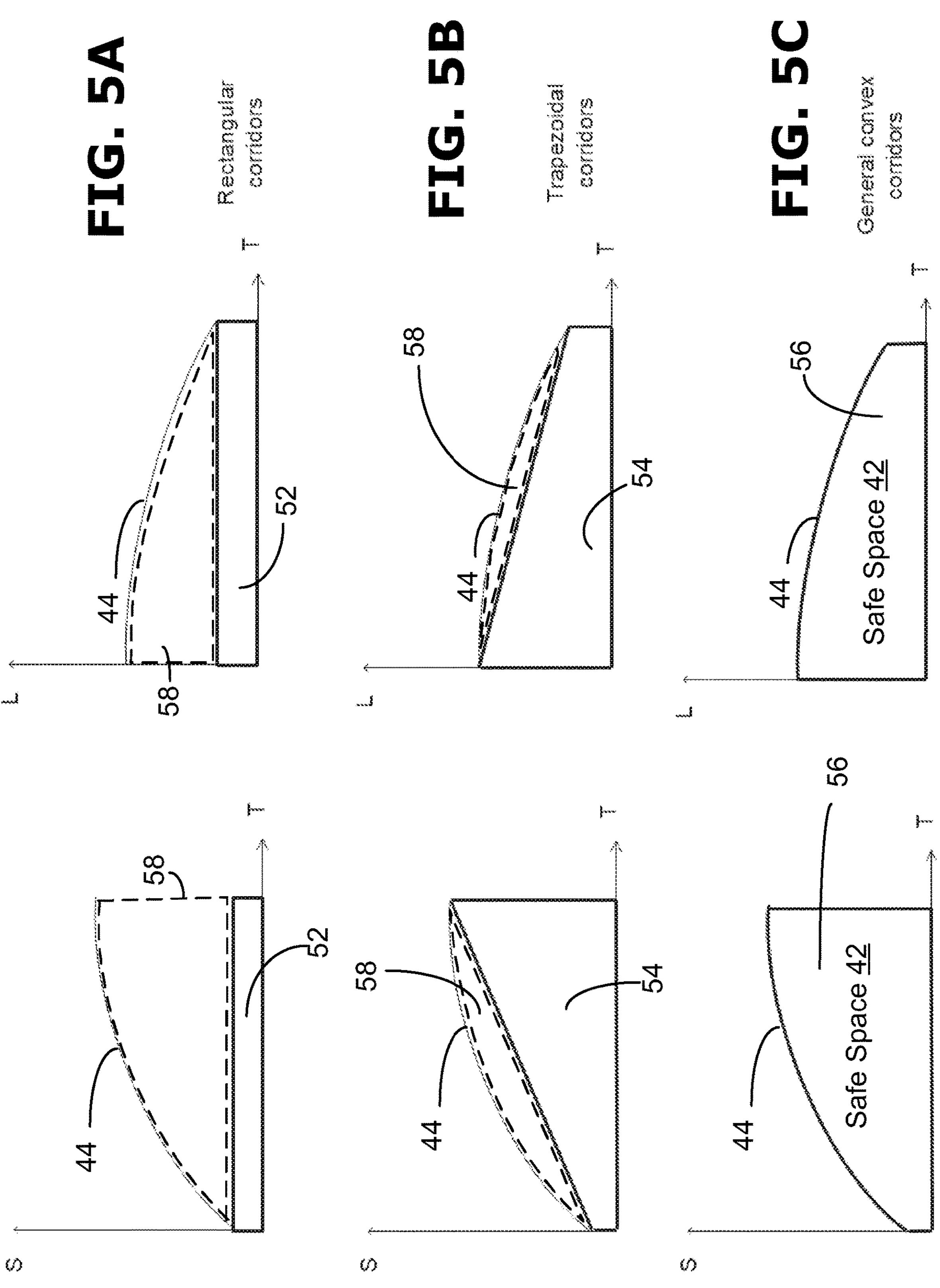
FIGS. 5A, 5B and 5C respectively illustrate rectangular corridors, trapezoidal corridors and general convex corridors that are used to define respective search spaces (in solid lines) and unsearched spaces (in dashed lines) for the safe regions of FIG. 4.

FIGS. 5A, 5B and 5C illustrate respective safe planning spatio-temporal corridors generating using respective approaches of: i) rectangular ST and LT search corridors 52 (FIG. 5A), ii) trapezoidal ST and LT search corridors 54 (FIG. 5B), and iii) general convex ST and LT search corridors 56 (FIG. 5C). In all cases, the corridors serve as safety passages in which the ego vehicle can maneuver collision-free. The corridor boundary can also enforce other constraints such as those imposed by the behaviour decisions, vehicle kinematics and dynamics, etc.

It will be noted that the general convex shape corridors of FIG. 5C provide a larger search space coverage of the available safe space under the safe space boundary curve 44 in comparison to the other corridor shapes, with the unsearched space being illustrated by dashed shapes 58 in FIGS. 5A and 58.

Figures 6A, 6B, 6C:
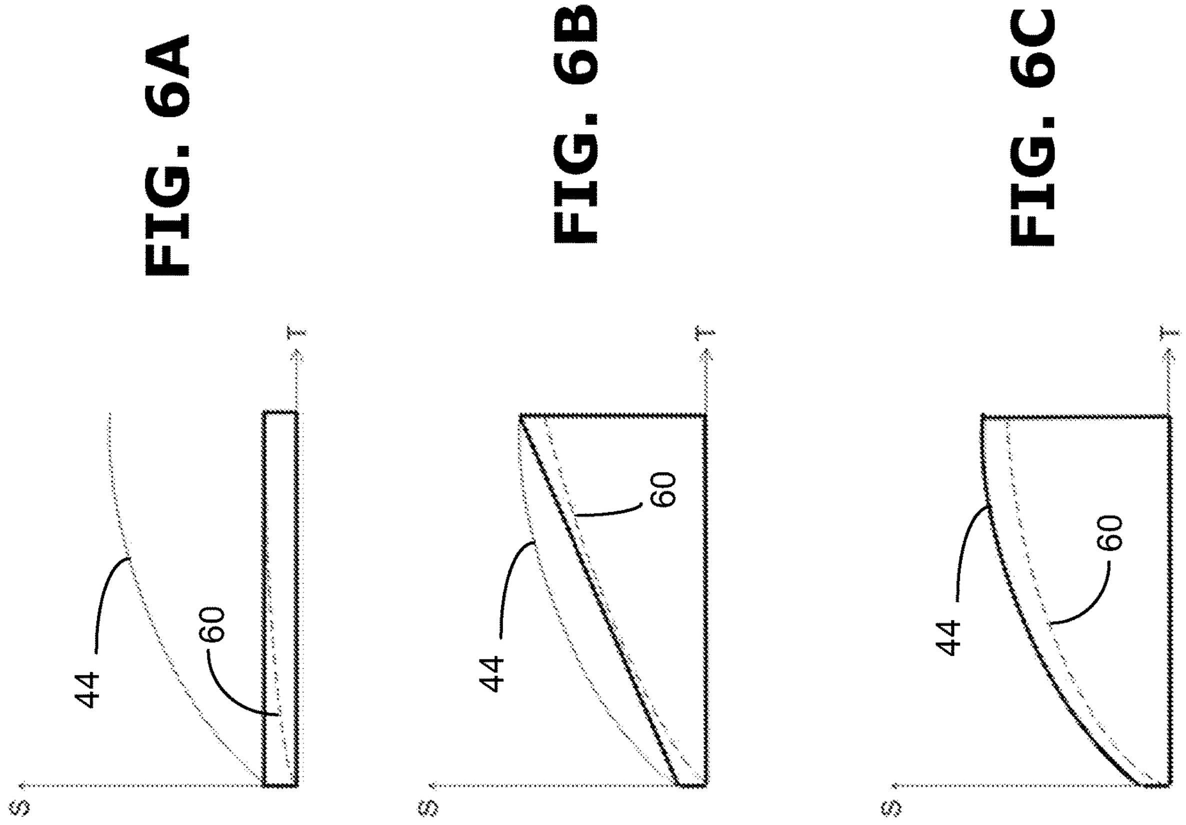
FIGS. 6A, 6B and 6C respectively illustrate trajectory curve segment solutions in the spatio-temporal plane corresponding to the corridors of FIGS. 5A, 5B and 5C, respectively.

An advantage of the larger search area that is enabled by the general convex shape corridors of FIG. 5C is graphically illustrated using ST plane graphs in FIGS. 6A, 6B and 6C where dashed line 60 illustrates a planned trajectory curve that stays within the boundary of the respective rectangular, trapezoidal and general convex corridors. As shown in FIGS. 6A, 6B and 6C, the greater the search area covered by a respective corridor, the lower is the deceleration required by the planned trajectory curve, which can improve overall comfort and smoothness as well as power conservation for the ego vehicle, thereby reducing power consumption. The same principle applies in LT plane. The ego vehicle requires less sharp steering, which also improves comfort.

Figure 1:
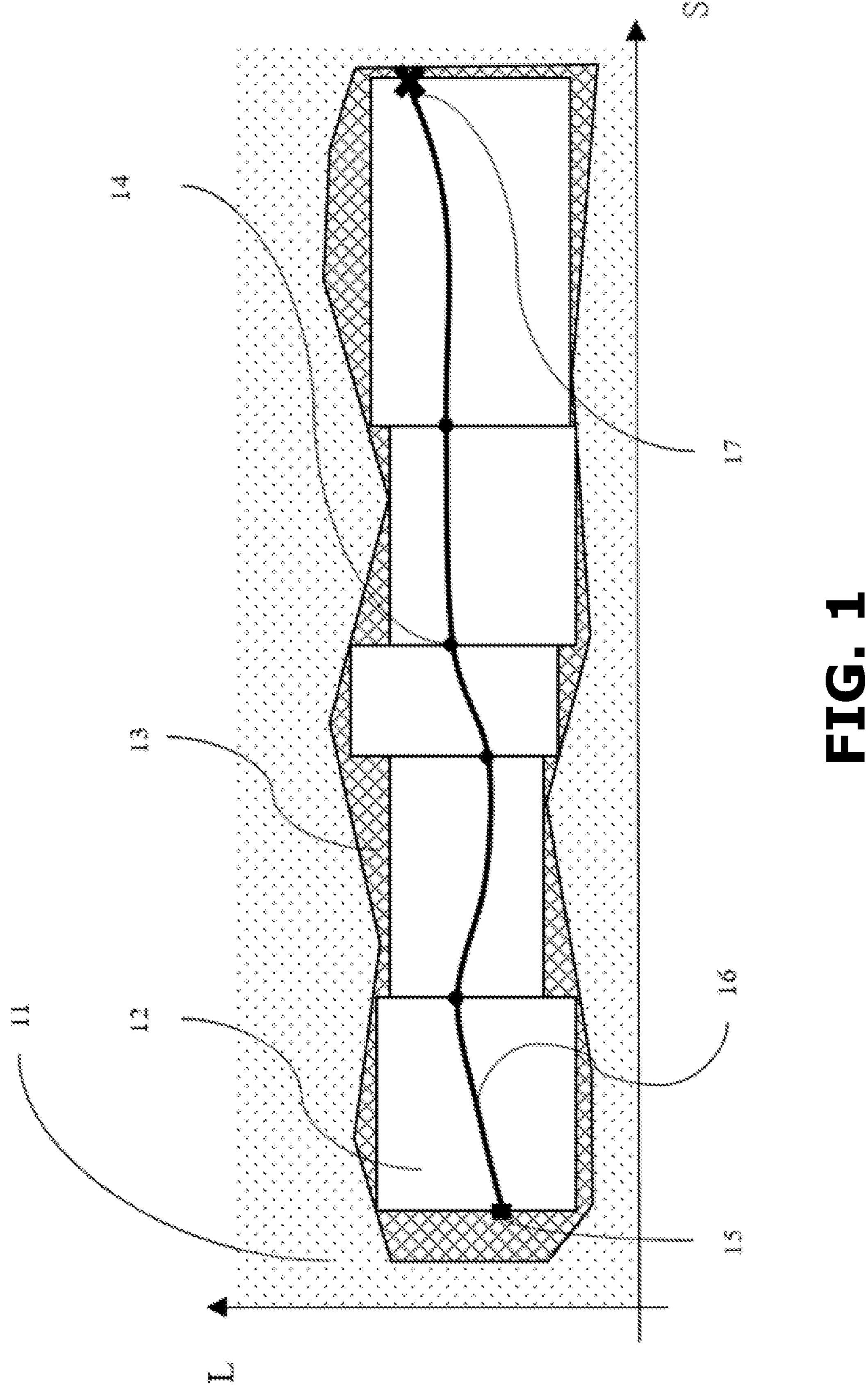
FIG. 1 shows a sample static driving scenario based on a set of successive corridors.
Figure 2A:
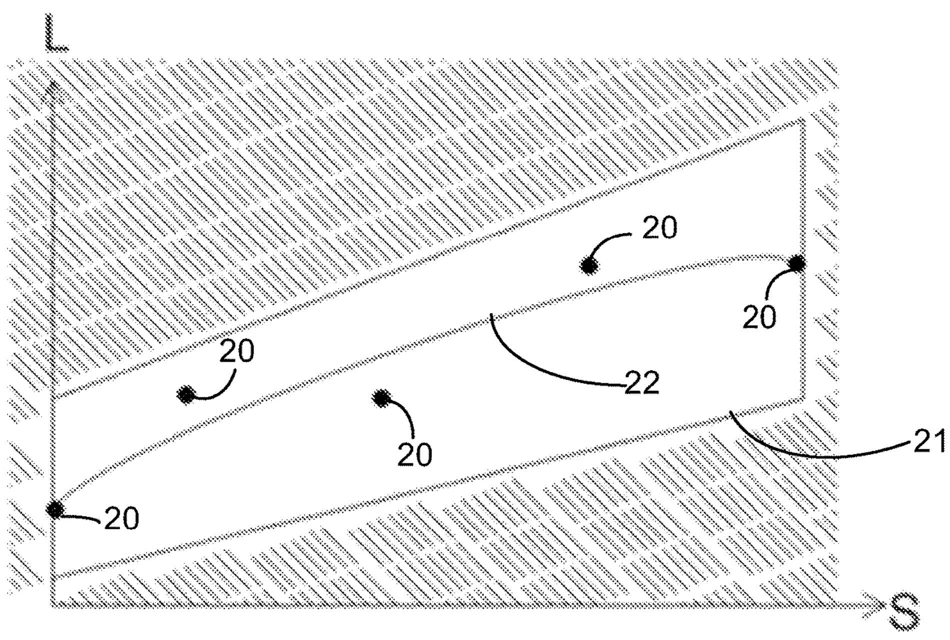
FIG. 2A shows a sample static driving scenario based on a trapezoidal corridor.
Figure 2B:
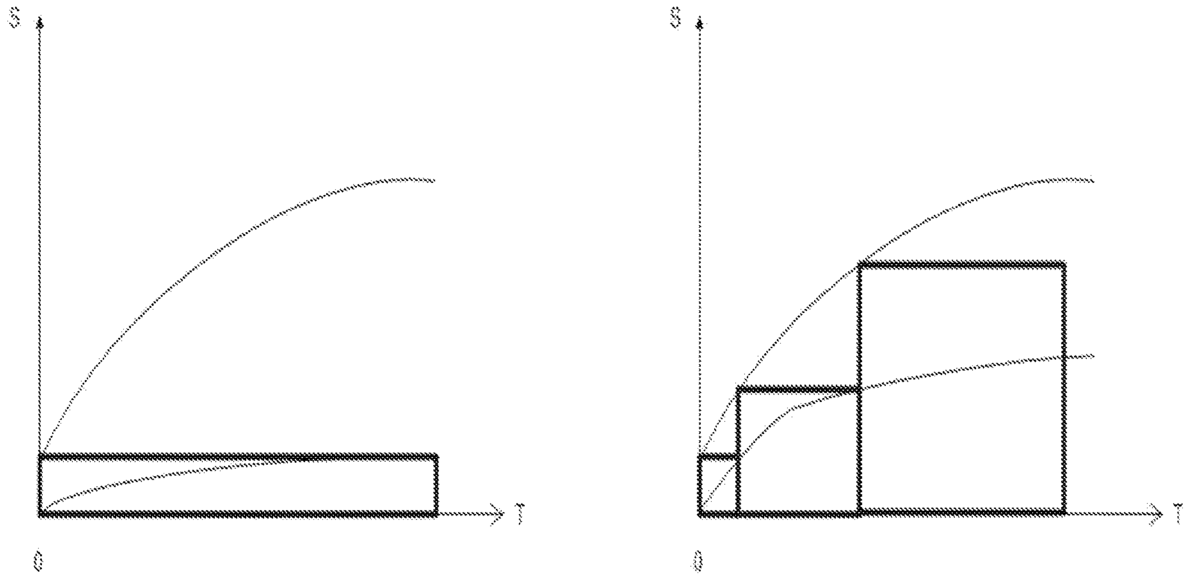
FIG. 2B shows a sample driving scenario where multiple corridors are used to replace a single corridor.

As noted above, for the case of rectangular corridors such as shown in FIG. 6A, one solution is to break the search space under safe space boundary curve 44 into multiple successive rectangular corridors different shapes, such as illustrated in FIGS. 2A and 2B. However, such a solution increases the computation cost for the space being considered as the number of corridors increases. It can also result in a more conservative trajectory with lower speed and rapid decelerations across the corridors. In contrast, the general convex corridors of FIGS. 5C and 6C cover the same (if not larger) portion of searchable area with the least possible number of corridors.

Nonetheless, rectangular corridors (rather than trapezoidal or general convex) are commonly used for safe trajectory planning in order to ensure that the "convex hull property" is maintained for a trajectory curve segment that is generated for the corridor. In particular, in order to ensure that a planned trajectory segment is safe, all of the points of a parametric curve (for example a Bezier curve) that define the trajectory curve segment that passes through the corridor must fall within the search space defined by the corridor. Curves are typically generated using a subset of control points that are bounded by the corridor. An n-order Bezier curve segment will include n+1 control points. However, for complex corridor shapes it can be difficult to ensure that the convex hull property is satisfied even if all control points fall within the corridor. The convex hall property (as long as control points are inside a convex boundary, the generated trajectory Bezier curve segment is also inside) only consistently holds true for rectangular corridors in spatio-temporal corridors.

Figure 7:
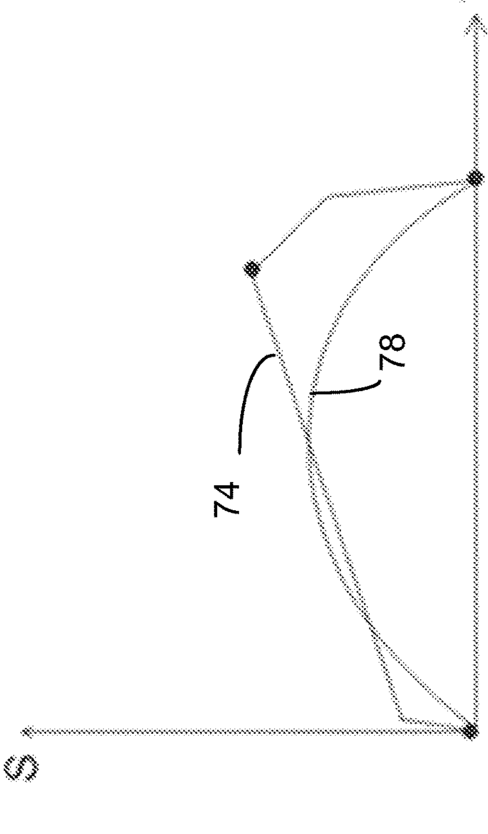
FIG. 7 shows examples of parametric curves and convex corridors, showing a situation where the convex hull property is not met.
Figure 7:
Figure 7:
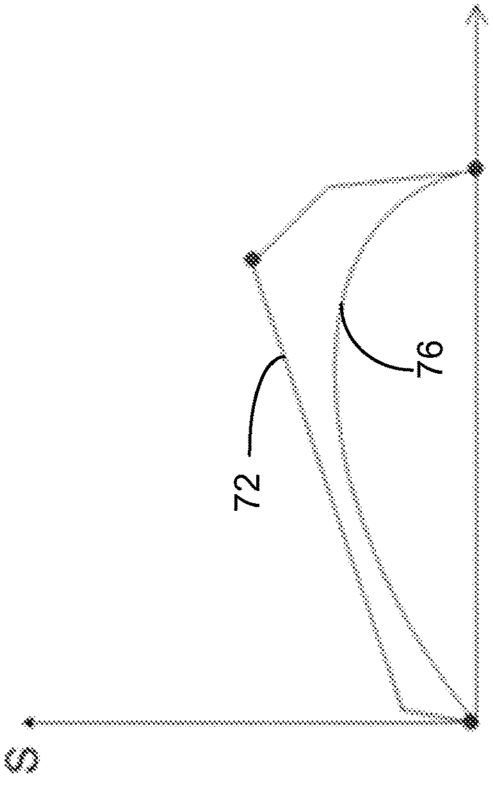

By way of illustrative example, FIG. 7 shows an example of a convex boundary 72 in an SL plane and a convex boundary 74 in a ST spatio-temporal plane, along with respective n-order Bezier curve segments 76 and 78 that have each been generated based on respective sets of n+1 control points that are located within the convex boundary 72 and convex boundary 74, respectively. As illustrated in FIG. 7, the generated Bezier curve segment 78 in the ST spatio-temporal plane goes partially out of the convex boundary, even though none of the control points are beyond the boundary. Although the convex hull property is satisfied by the Bezier curve segment 76 in the spatio-spatio SL plane, it does not hold for the Bezier curve segment 78 in the spatio-temporal ST plane.

According to example aspects of this disclosure, a motion planning system and method are described to generate safe trajectory curve segments in general convex corridors. The time-axis positions of the control points within a corridor can affect strongly the shape of a generated Bezier curve segment that extends through the corridor. In this regard, control point times and the upper and lower corridor boundary values corresponding to the control point times are determined as conditions to keep a generated Bezier curve inside a spatio-temporal convex corridor, while optimizing search area within the spatio-temporal convex corridor. As described in greater detail below, the times of, and upper and lower control point bounds for, the control points of a Bezier curve are computed in order to make the convex hull property hold for general spatio-temporal convex corridors. As a result, all points of the generated Bezier curve remain strictly inside the corridor(s), which guarantees safety, and may also guarantee implementation of behaviour decisions and other constraints in addition to safety.

In some examples, this approach can shrink the unsearched safe area (i.e., the area 58 in safe space 42 that is not included within a spatio-temporal convex corridor 56) to the order of $$O\left(\frac{1}{n^2}\right)$$

(where O is the order of the unsearched area 58 to the searchable area (e.g., safe space 42) and n is the number of control points), which is the best possible result. Thus, the square number of control points is inversely proportional to the unsearched area.

Example embodiments will be described in the context of n-order Bezier curves, although the methods and systems described herein can be applied to other n-order parametric curves including n-order B-spline curves for example.

Figure 8:
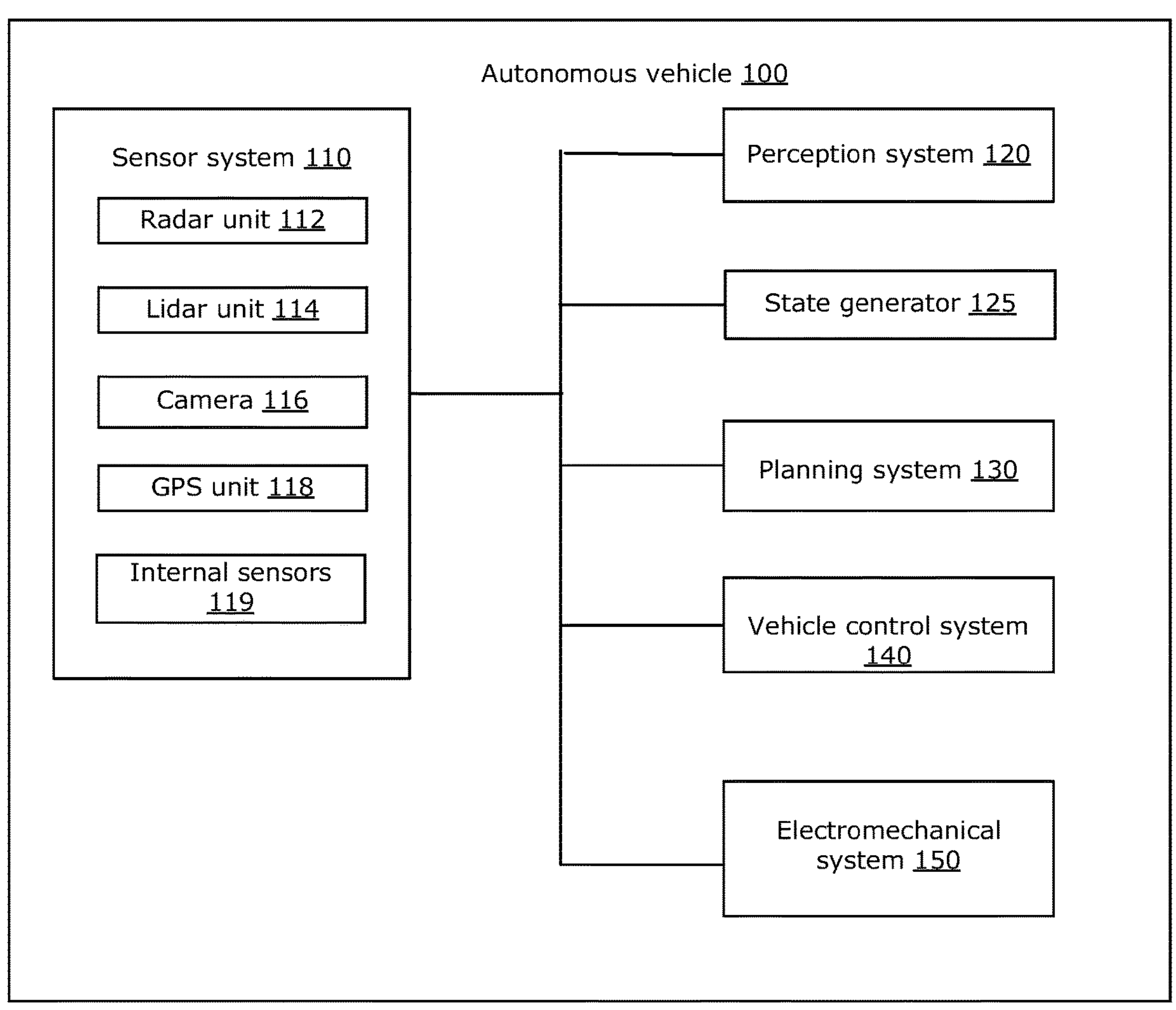
FIG. 8 is a block diagram illustrating some components of an example autonomous vehicle.
Figure 9:
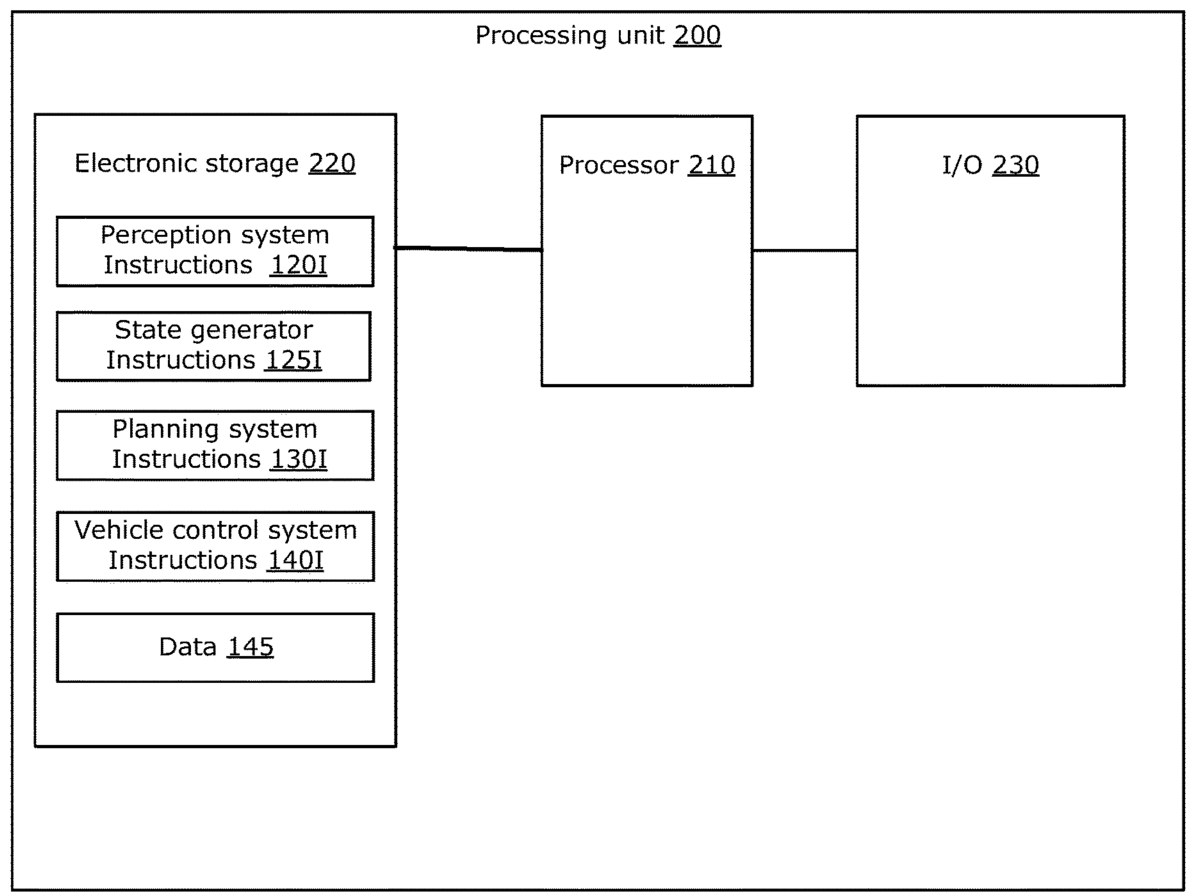
FIG. 9 is block diagram illustrating some components of a processing system that may be used to implement a planning system of the autonomous vehicle of FIG. 8 according to example embodiments.
Figure 10:
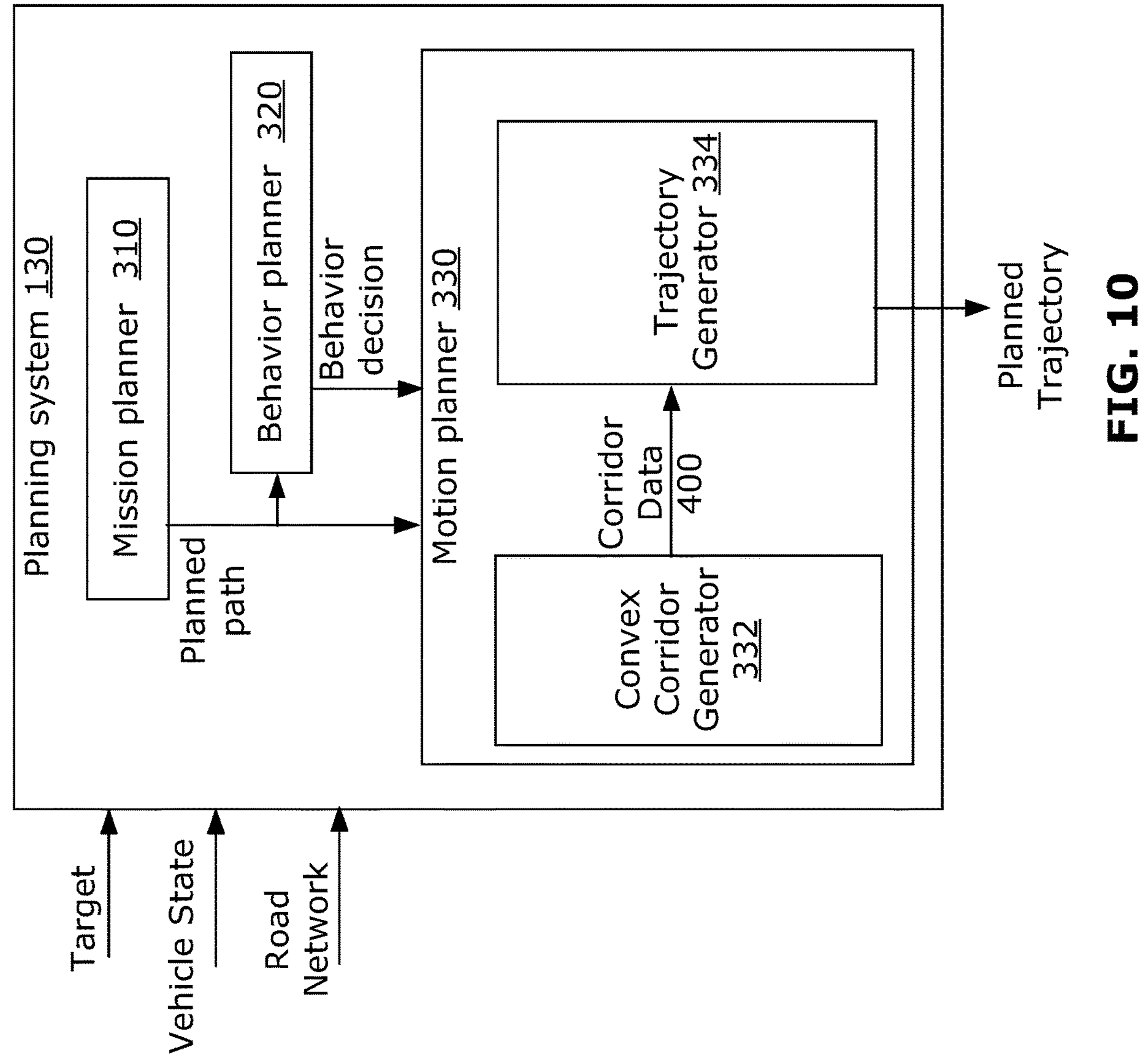
FIG. 10 is a block diagram illustrating further details of an example planning system.

A brief description of an autonomous vehicle to which the example planning systems and method described herein can be applied will now be provided with reference to FIGS. 8, 9 and 10.

An autonomous vehicle typically includes various software systems for perception and prediction, localization and mapping, as well as for planning and control. The software system for planning (generally referred to as a planning system) plans a trajectory for the vehicle to follow based on target objectives and physical parameters of the vehicle (e.g. wheelbase, vehicle width, vehicle length, etc.). A software system for control of the vehicle (e.g. a vehicle control system) receives the trajectory from the planning system and generates control commands to control operation of the vehicle to follow the trajectory. Although examples described herein may refer to a car as the autonomous vehicle, the teachings of the present disclosure may be implemented in other forms of autonomous (including semi-autonomous) vehicles including, for example, trams, subways, trucks, buses, surface and submersible watercraft and ships, aircraft, drones (also referred to as unmanned aerial vehicles (UAVs)), warehouse equipment, manufacturing facility equipment, construction equipment, farm equipment, mobile robots such as vacuum cleaners and lawn mowers, and other robotic devices. Autonomous vehicles may include vehicles that do not carry passengers as well as vehicles that do carry passengers.

FIG. 8 is a block diagram illustrating certain components of an example autonomous vehicle 100. The vehicle 100 includes a sensor system 110, a perception system 120, a state generator 125, a planning system 130, a vehicle control system 140 and an electromechanical system 150, for example. Other systems and components may be included in the vehicle 100 but are not shown for ease illustration. The perception system 120, the planning system 130, and the vehicle control system 140 in this example are distinct software systems that include machine readable instructions that may, for example, be executed by one or more processors in a processing system of the vehicle 100. Various systems and components of the vehicle may communicate with each other, for example through wired or wireless communication.

The sensor system 110 includes various sensing units, such as a radar unit 112, a LIDAR unit 114, and a camera 116, for collecting information about an environment surrounding the vehicle 100 as the vehicle 100 operates in the environment. The sensor system 110 also includes a global positioning system (GPS) unit 118 for collecting information about a location of the vehicle in the environment. The sensor system 110 also includes one or more internal sensors 119 for collecting information about the physical operating conditions of the vehicle 100 itself, including for example sensors for sensing steering angle, linear speed, linear and angular acceleration, pose (pitch, yaw, roll), compass travel direction, vehicle vibration, throttle state, brake state, wheel traction, transmission gear ratio, cabin temperature and pressure, etc.

Information collected by each sensing unit of the sensor system 110 is provided as sensor data to the perception system 120. The perception system 120 processes the sensor data received from each sensing unit to generate data about the vehicle and data about the surrounding environment. Data about the vehicle includes, for example, one or more of data representing a vehicle location; data representing the physical attributes of the vehicle, such as width and length, mass, wheelbase, slip angle; and data about the motion of the vehicle, such as linear speed and acceleration, travel direction, angular acceleration, pose (e.g., pitch, yaw, roll), and vibration, and mechanical system operating parameters such as engine RPM, throttle position, brake position, and transmission gear ratio, etc.). Data about the surrounding environment may include, for example, information about detected stationary and moving objects around the vehicle 100, weather and temperature conditions, road conditions, road configuration and other information about the surrounding environment. For example, sensor data received from the radar, LIDAR and camera units 112, 114, 116 may be used to determine the local operating environment of the vehicle 100. Sensor data from GPS unit 118 and other sensors may be used to determine the vehicle's location, defining a geographic position of the vehicle 100. Sensor data from internal sensors 119, as well as from other sensor units, may be used to determine the vehicle's motion attributes, including speed and pose (i.e. orientation) of the vehicle 100 relative to a frame of reference.

The data about the environment and the data about the vehicle 100 output by the perception system 120 is received by the state generator 125. The state generator 125 processes data about the environment and the data about the vehicle 100 to generate a state for the vehicle 100 (hereinafter vehicle state). Although the state generator 125 is shown in FIG. 8 as a separate software system, in some embodiments, the state generator 125 may be included in the perception system 120 or in the planning system 130.

The vehicle state is output from the state generator 125 in real-time to the planning system 130, which is the focus of the current disclosure and will be described in greater detail below. The vehicle control system 140 serves to control operation of the vehicle 100 based on the trajectory output by the planning system 130. The vehicle control system 140 may be used to generate control signals for the electromechanical components of the vehicle 100 to control the motion of the vehicle 100. The electromechanical system 150 receives control signals from the vehicle control system 140 to operate the electromechanical components of the vehicle 100 such as an engine, transmission, steering system and braking system.

FIG. 9 illustrates an example of a processing system 200 that may be implemented in the vehicle 100. The processing system 200 includes one or more processors 210. The one or more processors 210 may include a central processing unit (CPU), a graphical processing unit (GPU), a tensor processing unit (TPU), a neural processing unit (NPU), a digital signal processor, and/or another computational element. The processor(s) 210 are coupled to an electronic storage(s) 220 and to one or more input and output (I/O) interfaces or devices 230 such as network interfaces, user output devices such as displays, user input devices such as touchscreens, and so on.

The electronic storage 220 may include any suitable volatile and/or non-volatile storage and retrieval device(s), including for example flash memory, random access memory (RAM), read only memory (ROM), hard disk, optical disc, subscriber identity module (SIM) card, memory stick, secure digital (SD) memory card, and other state storage devices. In the example of FIG. 9, the electronic storage 220 of the processing system 200 stores instructions (executable by the processor(s) 210) for implementing the perception system 120 (instructions 120I), the state generator 125 (instructions 125I), the planning system 130 (instructions 130I), and the vehicle control system 140 (instructions 140I). In some embodiments, the electronic storage 220 also stores data 145, including sensor data provided by the sensor system 110, the data about the vehicle and the data about the environment output by the perception system 120 utilized by the planning system 130 to generate at least one of trajectories, and other data such as a road network map.

FIG. 10 is a block diagram that illustrates further details of the planning system 130.

The planning system 130 as shown can perform planning and decision making operations at different levels, for example at the mission level (e.g., mission planning performed by the mission planner 310), at the behavior level (e.g., behavior planning performed by the behavior planner 320) and at the motion level (e.g., motion planning performed by the motion planner 330). Mission planning is considered to be a higher (or more global) level of planning, motion planning is considered to be a lower (or more localized) level of planning, and behavior planning is considered to be a level between mission planning and motion planning. Generally, the output of planning and decision making operations at a higher level may form at least part of the input for a lower level of planning and decision making.

Generally, the purpose of planning and decision making operations is to determine a path and corresponding trajectories for the vehicle 100 to travel from an initial position (e.g., the vehicle's current position and orientation, or an expected future position and orientation) to a target position (e.g., a final destination defined by the user). As known in the art, a path is a sequence of configurations in a particular order (e.g., a path includes an ordered set of spatial coordinates) without regard to the timing of these configurations, whereas a trajectory is concerned about when each part of the path must be attained, thus specifying timing (e.g., a trajectory is the path with time stamp data, and thus includes a set of spatio-temporal coordinates). In some examples, an overall path may be processed and executed as a set of trajectories. The planning system 130 determines the appropriate path and trajectories with consideration of conditions such as the drivable ground (e.g., defined roadway), obstacles (e.g., pedestrians and other vehicles), traffic regulations (e.g., obeying traffic signals) and user-defined preferences (e.g., avoidance of toll roads).

Planning and decision making operations performed by the planning system 130 may be dynamic, i.e. they may be repeatedly performed as the environment changes. Thus, for example, the planning system 130 may receive a new vehicle state output by the state generator 125 and repeat the planning and decision making operations to generate a new plan and new trajectories in response to changes in the environment as reflected in the new vehicle state. Changes in the environment may be due to movement of the vehicle 100 (e.g., vehicle 100 approaches a newly-detected obstacle) as well as due to the dynamic nature of the environment (e.g., moving pedestrians and other moving vehicles).

Planning and decision making operations performed at the mission level (e.g. mission planning performed by the mission planner 310) relate to planning a path for the vehicle 100 at a high, or global, level. The first position of the vehicle 100 may be the starting point of the journey and the target position of the vehicle 100 may be the final destination point. Mapping a route to travel through a set of roads is an example of mission planning. Generally, the final destination point, once set (e.g., by user input) is unchanging through the duration of the journey. Although the final destination point may be unchanging, the path planned by mission planning may change through the duration of the journey. For example, changing traffic conditions may require mission planning to dynamically update the planned path to avoid a congested road.

Input data received by the mission planner 310 for performing mission planning may include, for example, GPS data (e.g., to determine the starting point of the vehicle 100), geographical map data (e.g., road network from an internal or external map database), traffic data (e.g., from an external traffic condition monitoring system), the final destination point (e.g., defined as x- and y-coordinates, or defined as longitude and latitude coordinates), as well as any user-defined preferences (e.g., preference to avoid toll roads).

The planned path generated by mission planning performed by the mission planner 310 and output by the mission planner 310 defines the route to be travelled to reach the final destination point from the starting point. The output may include data defining a set of intermediate target positions (or waypoints) along the route.

The behavior planner 320 receives the planned path from the mission planner 310, including the set of intermediate target positions (if any). The behavior planner 320 also receives the vehicle state output by the state generator 125. The behavior planner 320 generates a behavior decision based on the planned path and the vehicle state, in order to control the behavior of the vehicle 100 on a more localized and short-term basis than the mission planner 310. The behavior decision may serve as a target or set of constraints for the motion planner 330. The behavior planner 320 may generate a behavior decision that is in accordance with certain rules or driving preferences. Such behavior rules may be based on traffic rules, as well as based on guidance for smooth and efficient driving (e.g., vehicle should take a faster lane if possible). The behavior decision output from the behavior planner 320 may serve as constraints on motion planning, for example.

The motion planner 330 is configured to iteratively find a trajectory to achieve the planned path in a manner that satisfies the behavior decision, and that navigates the environment encountered along the planned path in a relatively safe, comfortable, and speedy way.

Figure 11:
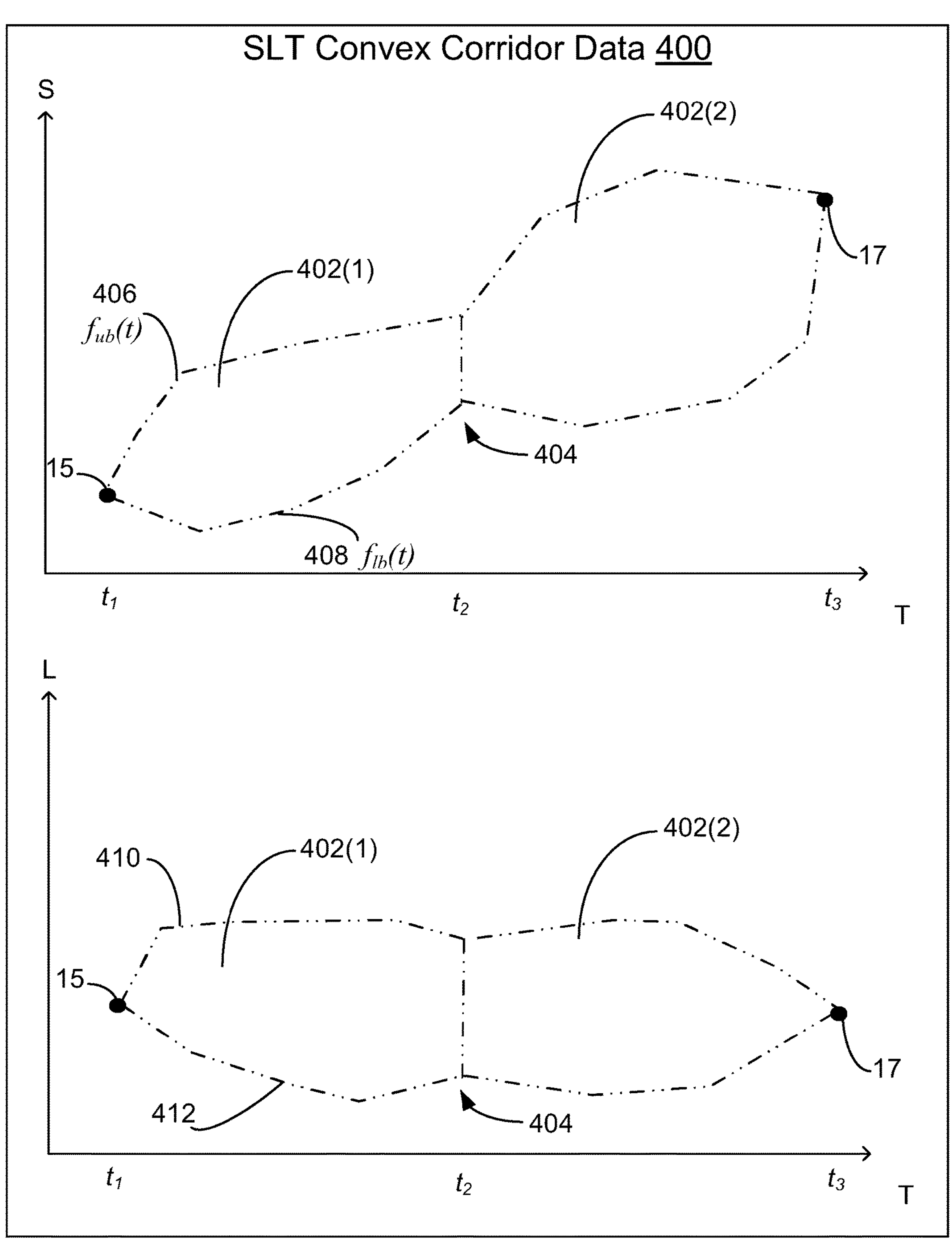
FIG. 11 graphically illustrates an example of convex corridor data.

In the example shown in FIG. 10, the motion planner 330 includes a convex corridor generator 332, and a trajectory generator 334. Although the inputs received by the convex corridor generator 332 can vary in different applications, in the illustrated example, convex corridor generator 332 receives as inputs the planned path, timing data, the vehicle state, the behavior decision, and, in the case of a structured environment, road network data. In an example embodiment, convex corridor generator 332 generates corridor data 400 that defines a plurality of successive general spatio-temporal convex corridors for a planning time horizon interval T. By way of example, FIG. 11 illustrates a simplified example graphically illustrating convex corridor data 400 for two successive convex corridors 402(1) and 402(2) that corresponds to a planning horizon interval of $T=t_3-t_1$, for the case where the planned path and timing data specifies a vehicle starting position 15 at time $t_1$ and vehicle target position 17 at time $t_3$. Each convex corridor 402(1) and 402(2) (referred to generically herein as convex corridor(s) 402) defines a respective collision-free search space for a respective trajectory segment. As indicated in FIG. 11, the end of convex corridor 402(1) overlaps with the start of convex corridor 402(2) at intermediate time $t_2$ (e.g., line 404) to provide a continuous corridor for a trajectory from starting position 15 at time $t_1$ and vehicle target position 17 at time $t_3$.

In example embodiments, the corridor data for each convex corridor 402 includes data that defines the convex corridor 402 in a 3D SLT Frenet frame space. In this regard, each convex corridor 402 is projected into 2D ST and LT spatio-temporal planes. Thus, the corridor data for each convex corridor 402 includes data that defines the convex corridor 402 in both the ST plane and the LT plane. For the ST-plane, the corridor data defines an upper bound 406 of the spatio-temporal convex corridor 402 in the S spatial dimension as a concave function of time (e.g. $f_{ub}(t)$) and defines a lower bound 408 of the spatio-temporal corridor in the S spatial dimension as a convex function of time (e.g. $f_{lb}(t)$). Similarly, for the LT-plane, the corridor data defines an upper bound 410 of the spatio-temporal convex corridor 402 in the L spatial dimension as a concave function of time and defines a lower bound 412 of the spatio-temporal corridor in the L spatial dimension as a convex function of time.

In FIG. 11, a set of successive convex corridors are shown. In some examples, some of the corridors in the plurality of corridors that are generated for a planned path for a planning time horizon interval may have shapes other than convex, such as rectangular or trapezoidal.

Figure 12:
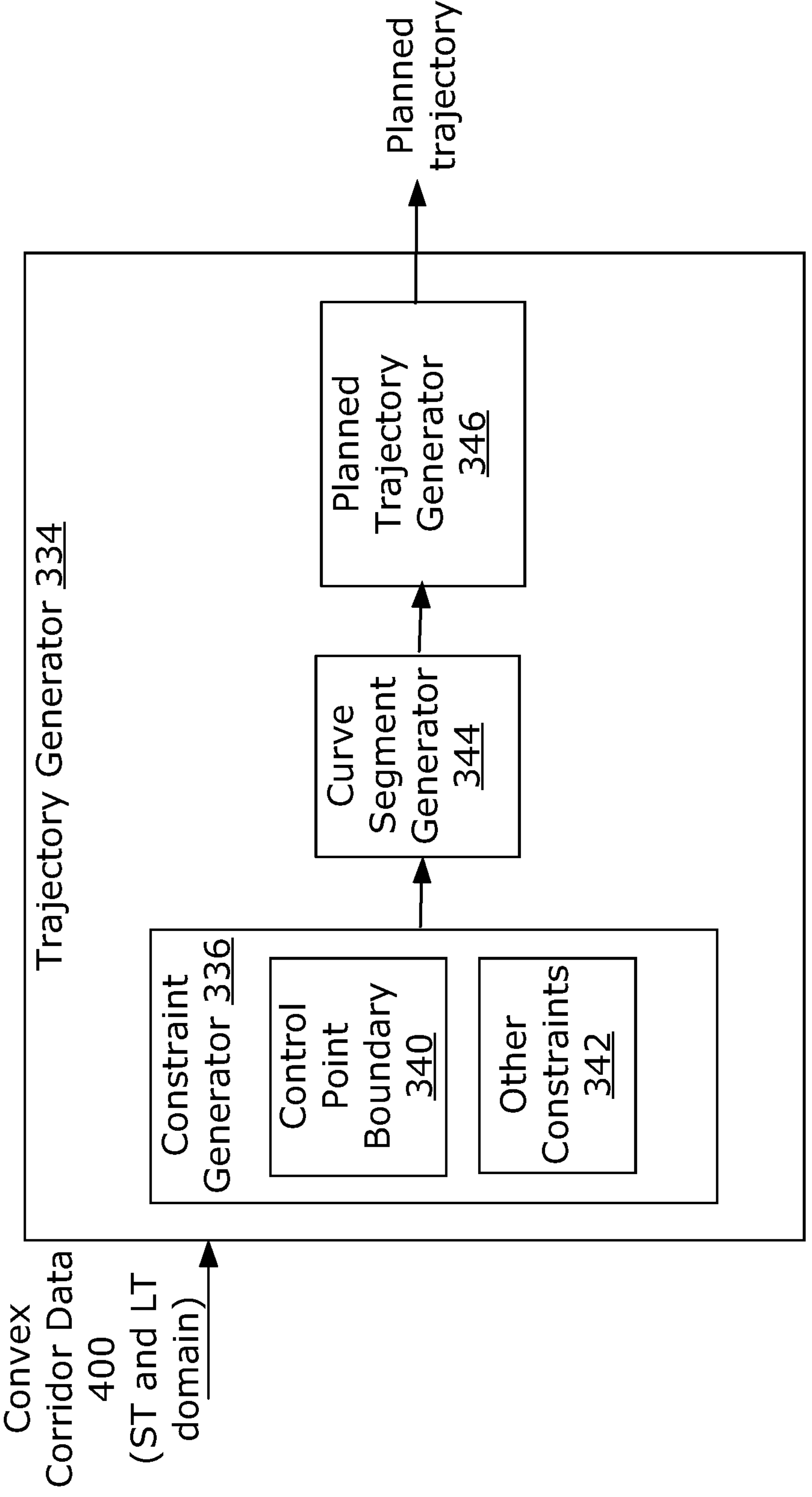
FIG. 12 is a block diagram illustrating further details of a trajectory generator of the example planning system of FIG. 10.

Referring to FIG. 12, the trajectory generator 334 is configured to receive, as inputs, the corridor data 400 generated by corridor generator 332 in respect of a planning horizon interval T, and output a respective planned trajectory from the vehicle starting position 15 to target position 17. Trajectory generator 334 is configured to treat the computation of a planned trajectory as an optimization problem, and in this regard can include the flowing operations (described in greater detail below): a constraint generator 336 that generates as set of constraints for the optimization problem; a curve segment generator 344 that computes a trajectory curve segment for each of the respective corridors; and a planned trajectory generator 346 that converts the plurality of generated curve segments into the output planned trajectory between an initial position 15 (for example the vehicle starting position) and target position 17. The output planned trajectory is then provided to vehicle control system 140 for implementation.

As noted above, each spatio-temporal convex corridor 402 includes data that defines upper and lower corridor boundaries in both the ST plane and the LT plane. In example embodiments, curve segment generator 344 generates a respective n-order Bezier curve segment for both the ST plane and the LT plane for each spatio-temporal convex corridor 402. As a precursor to determining the Bezier curve segments, control point boundary operation 340 is configured to compute a respective time position and a control range (e.g., an upper and lower bound) for each of n+1 control points for the respective Bezier curve segments that are to be generated by the curve segment generator 344 for the convex corridors 402. As noted above, in example embodiments, control points are computed to constrain a Bezier curve inside its respective spatio-temporal convex corridor 402. Control point boundary operation 340 computes respective time positions and upper and lower bounds for the n+1 control points of each Bezier curve segment in order to make the convex hull property hold for each convex corridor 402. As a result, all points of the generated ST plane and LT plane Bezier curve segments remain strictly inside their respective corridors 402.

Calculation of the control point time positions and spatial dimensional ranges by the control point boundary operation 340 will now be described for a trajectory that spans a spatio-temporal convex corridor 402 with reference to FIG. 13 which illustrates a simplified example of the ST plane of a spatio-temporal convex corridor 402 that spans a planning horizon interval. The following variable nomenclature is used below:

Variable Nomenclature

- t: Time
- $t_1$: Left extremity of time interval of corridor (corridor start time)
- $t_2$: Right extremity of time interval of corridor (corridor end time)
- $f_{ub}(t)$: Upper-bound function of corridor for ST plane
- $f_{lb}(t)$: Lower-bound function of corridor for LT plane
- n: Degree of Bezier polynomial used for an n-order Bezier curve segment
- i: Index of control points, i=0, 1, 2, 3, . . . , n
- $t_i$: The time of i-th control point As described above in respect of FIG. 11 and illustrated in FIG. 13, the ST plane of spatio temporal convex corridor 402 is defined by an upper bound 406 and a lower bound 408. The S spatial dimension values of upper bound 406 and lower bound 408 are defined in the corridor data 400 and can be represented as respective upper and lower bound time dependent functions $f_{ub}(t)$, $f_{lb}(t)$. The corridor 402 has a corridor start time $t_1$ and a corridor end time $t_2$. Control point boundary operation 340 is configured to compute a plurality of uniformly spaced control point times within the corridor start time $t_1$ and the corridor end time $t_2$. The uniformly spaced control point times include at least a start control point time (corridor start time $t_1$ in the illustrated example), an end control point time (corridor end time $t_2$ in the illustrated example) and one or more intermediate control point times (e.g. time $t_i$ in the illustrated example) between the start control point time and the end control point time. In particular, an n-order Bezier curve segment will include n+1 control points, and the respective control point, and the control point time for the i-th control point can be computed by control point boundary operation 340 according to the equation:

$$t_i = t_1 + \frac{i}{n}(t_2 - t_1) \quad (i = 0, 1, \ldots n) \qquad \text{(Equation 1)}$$

Control point boundary operation 340 then determines, for each of the uniformly spaced control point times, a respective control point maximum value that corresponds to the value of the S spatial dimension upper bound 406 at the respective control point time, and a respective control point minimum value that corresponds to the value of the S spatial dimension lower bound 408 at the respective control point time. For example, the control point maximum value on the S axis for an i-th control point is:

$$f_{ub}\left(t_1 + \frac{i}{n}(t_2 - t_1)\right). \qquad \text{(Equation 2)}$$

The control point minimum value on the S axis for an i-th control point is:

$$f_{lb}\left(t_1 + \frac{i}{n}(t_2 - t_1)\right) \qquad \text{(Equation 3)}$$

Similarly, for each of the control point times, control point boundary operation 340 also determines a respective control point maximum value in the LT plane that corresponds to the value of the L spatial dimension upper bound 410 at the respective control point time, and a respective control point minimum value that corresponds to the value of the L spatial dimension lower bound 412 at the respective control point time.

Accordingly, the outputs of control point boundary operation 340 for the spatio-temporal complex corridor 402 includes n+1 control point times, along with respective maximum and minimum values for n+1 control points of an n-order Bezier curve segment in the ST plane and respective maximum and minimum values for n+1 control points of an n-order Bezier curve segment in the LT plane.

In at least some examples, constraint generator 336 also includes one or more operations 342 for generating other constraints for the ST and LT plane Bezier curve segments. For example, other constraints can be generated for each of the control points to address issues such as continuity of curve segments between successive corridors 402, behaviour decisions, and dynamic limits of the vehicle 100. For example, the initial control point of a trajectory curve segment is constrained by the computed trajectory segment of the previous corridor in order to provide continuity. Examples of various types of constraints that can be generated in respect of control points can be found for example in reference document [1]: Ding, Wenchao, et al. "*Safe trajectory generation for complex urban environments using spatio-temporal semantic corridor.*" *IEEE Robotics and Automation Letters* 4.3 (2019): 2997-3004.

The control point constraints (including the respective maximum and minimum values and times generated by the control point boundary operation 340 and any other constraints generated by operations 342 (such as the constraints required to locate the initial control point of a trajectory segment at the final control point of a preceding trajectory segment) are provided to curve segment generator 344. Curve segment generator 344 is configured to generate, based on the control point constraints, respective control point spatial dimension values for each of the control point times that will provide optimized Bezier curve segments for the LT plane and the ST plane of each spatio-temporal complex corridor 402. In example embodiments, curve segment generator 344 is configured to determine, for each spatio-temporal complex corridor 402 defined in corridor data for a planning time horizon interval, the control point coordinates in the ST plane that will minimize a first predefined cost function for the planning time horizon interval, and the control point coordinates in the LT plane that will minimize a second predefined cost function for the planning time horizon interval.

Examples of cost functions can be found for example in reference document [1]: Ding, Wenchao, et al. “Safe trajectory generation for complex urban environments using spatio-temporal semantic corridor.” IEEE Robotics and Automation Letters 4.3 (2019): 2997-3004, and reference document [2]: Li, Jialun, et al. “Speed Planning Using Bezier Polynomials with Trapezoidal Corridors.” arXiv preprint arXiv:2104.11655 (2021).

Figure 13:
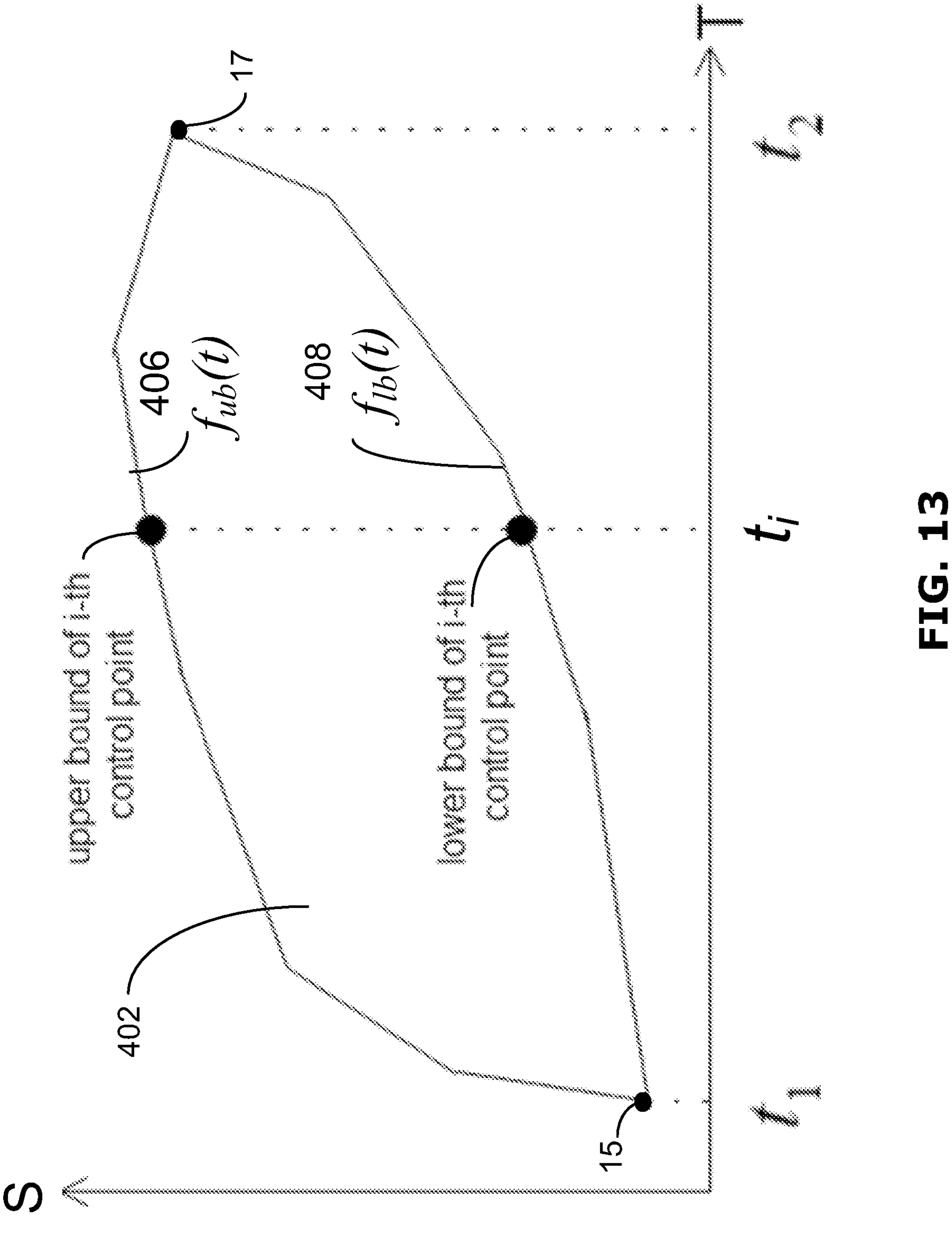
FIG. 13 graphically illustrates an example of a convex corridor.
Figures 14A, 14B:
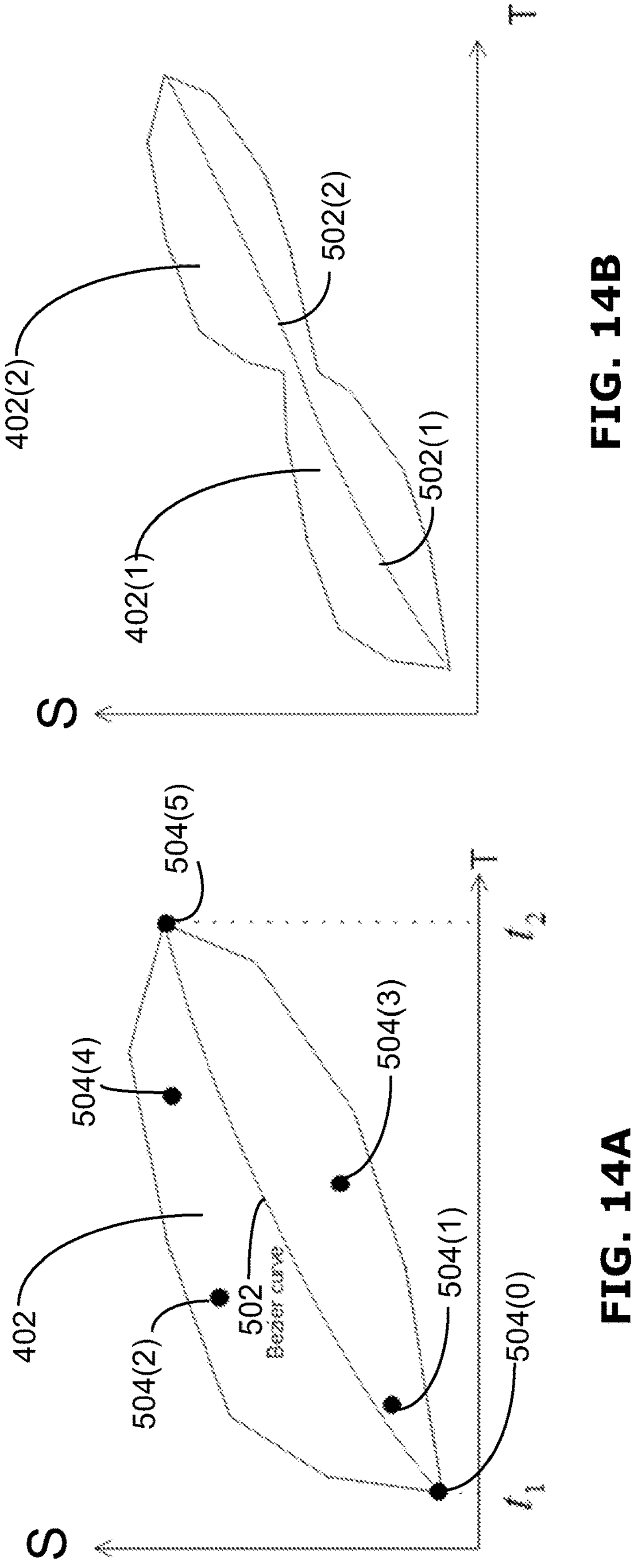
FIGS. 14A and 14B graphically illustrates examples of Bezier curve segments within convex corridors.

By way of illustration, FIG. 14A illustrates an example of a n=5 order Bezier curve segment 502 that corresponds to 6 ST plane control points 504(0) to 504(5) that have been generated by curve segment generator 344 in respect of the spatio-temporal convex corridor 402 of FIG. 13. In many scenarios, the planning time horizon interval will include multiple successive corridors having overlapping start and end times, and in this regard FIG. 14B shows examples of first and second spatio-temporal convex corridors 402(1) and 402(2) and respective Brezier curve segments 502(1) and 502(2) that corresponds to ST plane control points that have been generated by curve segment generator 344 in respect of the spatio-temporal convex corridors 402(1) and 402(2). The respective Brezier curve segments 502(1) and 502(2) are scaled joined piece-wide with the end time of Brezier curve segment 502(1) being coincident in time and space with the start time of Brezier curve segment 502(2). The Brezier curve segments 502(1) and 502(2) can collectively be used to define a planned trajectory for the planning horizon interval. As can be seen in FIGS. 14A and 14B, the control points and resulting curve segments all achieve the convex hull property.

Referring again to FIG. 12, the optimized Brezier curve segments as defined by the ST plane and LT plane control points computed by curve segment generator 344 are provided as inputs for planned trajectory generator 346. Planned trajectory generator converts the format of the Brezier curve segments in the ST and LT planes to a planned trajectory that can be implemented by vehicle control system 140. For example, the planned trajectory may include a plurality of coordinate points that each include a first dimensional value, a second dimensional value, and a time stamp for a 3D reference space coordinate system usable by vehicle control system 140.

Figure 15:
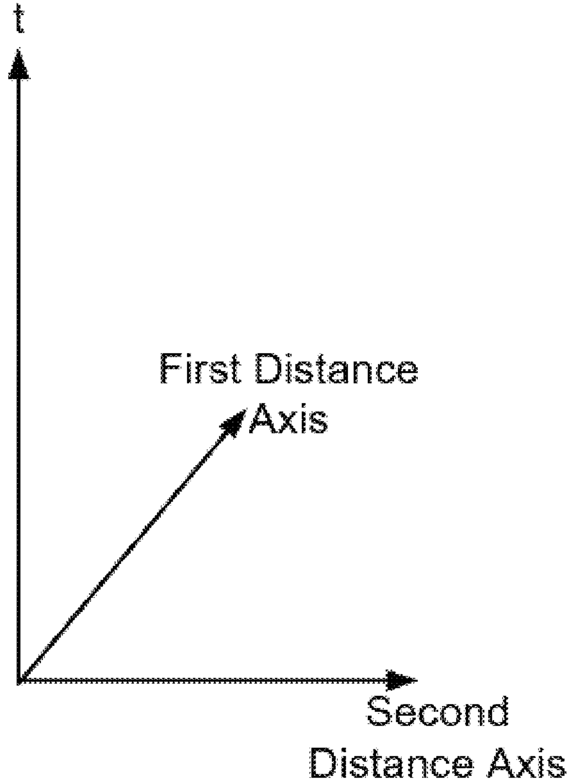
FIG. 15 shows a representation of a three dimensional Cartesian coordinate system having to a first distance axis and a second distance axis representing first and second spatial dimensions and a third axis representing a time axis.

Although convex corridors have been described above in the context of the Frenet frame with an S spatial dimension corresponding to a longitudinal distance along a tangent vector of a roadway and an L spatial dimension corresponding to a lateral distance to the roadway along a normal vector of the road, the systems and methods described above can be adapted to other spatio-temporal formats. For example, the spatial dimensions could correspond respectively to a first distance axis and a second distance axis in a three dimensional Cartesian coordinate system having time as a third axis, as shown in FIG. 15.

Further, in some cases the control points may only need to be computed in respect of a single spatio temporal plane. For example, in the case of vehicle that follows a defined track such a train locomotive, computations may in some scenarios be limited to the ST plane. Further, in the case of vehicles that are capable of movement in 3 spatial dimensions such as an airborne drone, a third spatial-temporal plane may need to be added to the computations.

Although examples have been described in the context of autonomous vehicles, it should be understood that the present disclosure is not limited to autonomous vehicles. For example, any vehicle that includes advanced driver-assistance system for a vehicle that includes a planning system may benefit from a motion planner that performs the trajectory generation, trajectory evaluation, trajectory selection operations of the present disclosure. Further, any vehicle that includes an automated driving system that can operate a vehicle fully autonomously or semi-autonomously may also benefit from a motion planner that performs the trajectory generation, trajectory evaluation, trajectory selection operations of the present disclosure. A planning system that includes the motion planner of the present disclosure may be useful for enabling a vehicle to navigate a structured or unstructured environment, with static and/or dynamic obstacles.

Although the present disclosure describes methods and processes with operations in a certain order, one or more operations of the methods and processes may be omitted or altered as appropriate. One or more operations may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A computer implemented method for motion planning for an autonomous vehicle, comprising:

receiving data defining: (i) a first dimension upper bound of a spatio-temporal convex corridor in a first spatial dimension as a concave function of time between a corridor start time and a corridor end time, and (ii) a first dimension lower bound of the spatio-temporal convex corridor in the first spatial dimension as a convex function of time between the corridor start time and the corridor end time, the first spatial dimension corresponding to a first spatio-temporal plane;

computing a plurality of control point times within the corridor start time and the corridor end time, the plurality of control point times including at least a start control point time, an end control point time and an intermediate control point time between the start control point time and the end control point time;

determining, for each control point time in the plurality of control point times, a respective first control point maximum value that corresponds to a value of the first dimension upper bound at the control point time;

determining, for each control point time in the plurality of control point times, a respective first control point minimum value that corresponds to a value of the first dimension lower bound at the control point time;

computing, for each control point time in the plurality of control point times, a respective first dimension control point value based on the respective first control point maximum value and the respective first control point minimum value for the control point time, the respective first dimension control point values collectively defining a first curve segment that is within the first dimension upper bound and the first dimension lower bound of the spatio-temporal convex corridor; and outputting a planned trajectory for controlling an operation of the autonomous vehicle based on the first curve segment.

2. The method of claim 1 wherein computing the respective first dimension control point values is performed to collectively optimize a first defined cost function for the first curve segment through the spatio-temporal convex corridor in the first spatio-temporal plane.

3. The method of claim 1 wherein the first spatial dimension corresponds to one of: (i) a longitudinal distance along a tangent vector of a road and (ii) a lateral distance to the road along a normal vector of the road.

4. The method of claim 1 wherein the first spatial dimension corresponds to a distance axis in a three dimensional Cartesian coordinate system having time as another axis.

5. The method of claim 1 wherein:

the received data also defines: (iii) a second dimension upper bound of the spatio-temporal convex corridor in a second spatial dimension as a concave function of time between the corridor start time and corridor end time, and (iv) a second dimension lower bound of the spatio-temporal convex corridor in the second spatial dimension as a convex function of time between the corridor start time and the corridor end time, the second spatial dimension corresponding to a second spatio-temporal plane that coincides in time with the first spatio-temporal plane;

the method comprising:

determining, for each control point time of the plurality of control point times, a respective second control point maximum value that corresponds to a value of the second dimension upper bound at the control point time;

determining, for each control point time of the plurality of control point times, a respective second control point minimum that corresponds to a value of the second dimension lower bound at the control point time;

computing, for each control point time in the plurality of control point times, a respective second dimension control point value based on the respective second control point maximum value and the respective second control point minimum value for the control point time, the respective second dimension control point values collectively defining a second curve segment that falls within the second dimension upper bound of the spatio-temporal convex corridor and the second dimension upper bound of the spatio-temporal convex corridor;

wherein the planned trajectory is outputted based on both the first curve segment and the second curve segment.

6. The method of claim 5 wherein computing the respective second dimension control point values is performed to collectively optimize a second defined cost function for the second curve segment through the spatio-temporal convex corridor in the second spatio-temporal plane.

7. The method of claim 5 wherein the first spatial dimension corresponds x of a road and the second spatial dimension corresponds to a lateral distance to the road along a normal vector of the road.

8. The method of claim 5 wherein the first spatial dimension and second spatial dimension correspond respectively to a first distance axis and a second distance axis in a three dimensional Cartesian coordinate system having time as a third axis.

9. The method of claim 1 wherein the first curve segment is an n-order parametric curve and the plurality of control point times includes n+1 plurality of control point times that are uniformly spaced in time.

10. The method of claim 9 wherein the first curve segment is an n-order Bezier curve.

11. The method of claim 9 wherein the first curve segment is an n-order B-spline curve.

12. The method of claim 1 wherein the received data defines respective first dimension upper bounds and first dimension lower bounds for a plurality of successive spatio-temporal convex corridors; respective first curve segments are generated for each of the successive spatio-temporal convex corridors; and the planned trajectory for the autonomous vehicle extends through the plurality of successive spatio-temporal convex corridors and is computed based on the respective first curve segments.

13. The method of claim 12 comprising computing constraints for each of the successive spatio-temporal convex corridors to provide continuity for the planned trajectory that extends through the successive spatio-temporal convex corridors, wherein the respective first curve segments generated for each of the successive spatio-temporal convex corridors are also based on the constraints.

14. A system for path planning for an autonomous vehicle, the system comprising a processing system comprising one or more processors and one or more memories coupled to the one or more processors, the one or more memories storing executable instructions that, when executed by the one or more processors, cause the system to perform a method comprising:

receiving data defining: (i) a first dimension upper bound of a spatio-temporal convex corridor in a first spatial dimension as a concave function of time between a corridor start time and a corridor end time, and (ii) a first dimension lower bound of the spatio-temporal convex corridor in the first spatial dimension as a convex function of time between the corridor start time and the corridor end time, the first spatial dimension corresponding to a first spatio-temporal plane;

computing a plurality of control point times within the corridor start time and the corridor end time, the plurality of control point times including at least a start control point time, an end control point time and an intermediate control point time between the start control point time and the end control point time;

determining, for each control point time in the plurality of control point times, a respective first control point maximum value that corresponds to a value of the first dimension upper bound at the control point time;

determining, for each control point time in the plurality of control point times, a respective first control point minimum value that corresponds to a value of the first dimension lower bound at the control point time;

computing, for each control point time in the plurality of control point times, a respective first dimension control point value based on the respective first control point maximum value and the respective first control point minimum value for the control point time, the respective first dimension control point values collectively defining a first curve segment that is within the first dimension upper bound and the first dimension lower bound of the spatio-temporal convex corridor; and outputting a planned trajectory for controlling an operation of the autonomous vehicle based on the first curve segment.

15. The system of claim 14 wherein computing the first dimension control point values is performed to collectively optimize a first defined cost function for the first curve segment through the spatio-temporal convex corridor in the first spatio-temporal plane.

16. The system of claim 14 wherein the first spatial dimension corresponds to one of: (i) a longitudinal distance along a tangent vector of a road and (ii) a lateral distance to the road along a normal vector of the road.

17. The system of claim 14 wherein the first spatial dimension corresponds to a distance axis in a three dimensional Cartesian coordinate system having time as another axis.

18. The system of claim 14 wherein:

the received data also defines: (iii) a second dimension upper bound of the spatio-temporal convex corridor in a second spatial dimension as a concave function of time between the corridor start time and corridor end time, and (iv) a second dimension lower bound of the spatio-temporal convex corridor in the second spatial dimension as a convex function of time between the corridor start time and the corridor end time, the second spatial dimension corresponding to a second spatio-temporal plane that coincides in time with the first spatio-temporal plane;

the method comprising:

determining, for each control point time of the plurality of control point times, a respective second control point maximum value that corresponds to a value of the second dimension upper bound at the control point time;

determining, for each control point time of the plurality of control point times, a respective second control point minimum that corresponds to a value of the second dimension lower bound at the control point time;

computing, for each control point time in the plurality of control point times, a respective second dimension control point value based on the respective second control point maximum value and the respective second control point minimum value for the control point time, the respective second dimension control point values collectively defining a second curve segment that falls within the second dimension upper bound of the spatio-temporal convex corridor and the second dimension upper bound of the spatio-temporal convex corridor;

wherein the planned trajectory is outputted based on both the first curve segment and the second curve segment.

19. The system of claim 18 wherein computing the respective second dimension control point values is performed to collectively optimize a second defined cost function for the second curve segment through the spatio-temporal convex corridor in the second spatio-temporal plane.

20. A non-transient computer-readable medium storing processor executable instructions which, when executed by a processor of a processing system, cause the processing system to perform a method comprising:

receiving data defining: (i) a first dimension upper bound of a spatio-temporal convex corridor in a first spatial dimension as a concave function of time between a corridor start time and a corridor end time, and (ii) a first dimension lower bound of the spatio-temporal convex corridor in the first spatial dimension as a convex function of time between the corridor start time and the corridor end time, the first spatial dimension corresponding to a first spatio-temporal plane;

computing a plurality of control point times within the corridor start time and the corridor end time, the plurality of control point times including at least a start control point time, an end control point time and an intermediate control point time between the start control point time and the end control point time;

determining, for each control point time in the plurality of control point times, a respective first control point maximum value that corresponds to a value of the first dimension upper bound at the control point time;

determining, for each control point time in the plurality of control point times, a respective first control point minimum value that corresponds to a value of the first dimension lower bound at the control point time;

computing, for each control point time in the plurality of control point times, a respective first dimension control point value based on the respective first control point maximum value and the respective first control point minimum value for the control point time, the respective first dimension ontrol point values collectively defining a first curve segment that is within the first dimension upper bound and the first dimension lower bound of the spatio-temporal convex corridor; and outputting a planned trajectory for controlling an operation of the autonomous vehicle based on the first curve segment.

* * * * *